United States Patent
Polehn et al.

(10) Patent No.: US 9,338,148 B2
(45) Date of Patent: May 10, 2016

(54) SECURE DISTRIBUTED INFORMATION AND PASSWORD MANAGEMENT

(71) Applicants: Verizon Patent and Licensing Inc., Basking Ridge, NJ (US); Cellco Partnership, Basking Ridge, NJ (US)

(72) Inventors: Donna L. Polehn, Kirkland, WA (US); Lalit R. Kotecha, San Ramon, CA (US); Patricia R. Chang, San Ramon, CA (US); Deepak Kakadia, Antioch, CA (US); John F. Macias, Antelope, CA (US); Priscilla Lau, Fremont, CA (US); Arda Aksu, Martinez, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 189 days.

(21) Appl. No.: 14/072,303

(22) Filed: Nov. 5, 2013

(65) Prior Publication Data

US 2015/0127940 A1     May 7, 2015

(51) Int. Cl.
*H04L 29/06* (2006.01)
*H04N 21/254* (2011.01)
*H04N 21/258* (2011.01)
*H04N 21/266* (2011.01)
*H04N 21/6334* (2011.01)

(52) U.S. Cl.
CPC .......... *H04L 63/0435* (2013.01); *H04L 63/083* (2013.01); *H04N 21/2541* (2013.01); *H04N 21/25816* (2013.01); *H04N 21/25875* (2013.01); *H04N 21/26613* (2013.01); *H04N 21/63345* (2013.01); *H04L 2463/101* (2013.01)

(58) Field of Classification Search
CPC .... H04L 63/0428; H04L 63/08; H04L 63/062
See application file for complete search history.

(56) References Cited

U.S. PATENT DOCUMENTS

| | | | |
|---|---|---|---|
| 7,363,651 B2* | 4/2008 | de Jong et al. | 726/7 |
| 2002/0073177 A1* | 6/2002 | Clark et al. | 709/219 |
| 2007/0242824 A1* | 10/2007 | Vishik | 380/200 |
| 2008/0154780 A1* | 6/2008 | Soukup et al. | 705/54 |
| 2009/0178093 A1* | 7/2009 | Mitsuji et al. | 725/104 |
| 2012/0331529 A1* | 12/2012 | Ibel et al. | 726/4 |
| 2013/0174223 A1* | 7/2013 | Dykeman et al. | 726/4 |

OTHER PUBLICATIONS

Multiple Image Watermarking Applied to Health Information Management|http://ieeexplore.ieee.org/stamp/stamp.jsptp=&arnumber=1707685|pp. 722-732|2006|Giakoumaki et al.*

* cited by examiner

*Primary Examiner* — Mahfuzur Rahman

(57) ABSTRACT

A method, performed by a computer device, may include receiving an indication that a first user has acquired rights to access a digital content; generating a key for the digital content; encrypting the digital content using the generated key to generate encrypted digital content; obtaining a first passcode; and providing the first passcode and the encrypted digital content to a user device associated with the first user. The method may further include receiving, from the user device, a request for the key, wherein the request include the first passcode; determining that the first passcode is valid; determining that the key has not expired; and providing the key to the user device, in response to determining that the first passcode is valid and that the key has not expired.

20 Claims, 11 Drawing Sheets

SECURE DISTRIBUTED INFORMATION AND PASSWORD MANAGEMENT

BACKGROUND INFORMATION

A user may purchase digital content from a digital content provider. The digital content may include, for example, a digital book or another type of digital publication, a song or another type of digital audio file, or a movie or another type of digital video file. The digital content may be protected by digital rights management (DRM) technology in order to prevent unauthorized reproduction or access to the digital content. DRM technology may prevent the user from selling, or otherwise transferring, the digital content to another user.

DETAILED DESCRIPTION OF PREFERRED EMBODIMENTS

Figure 1:
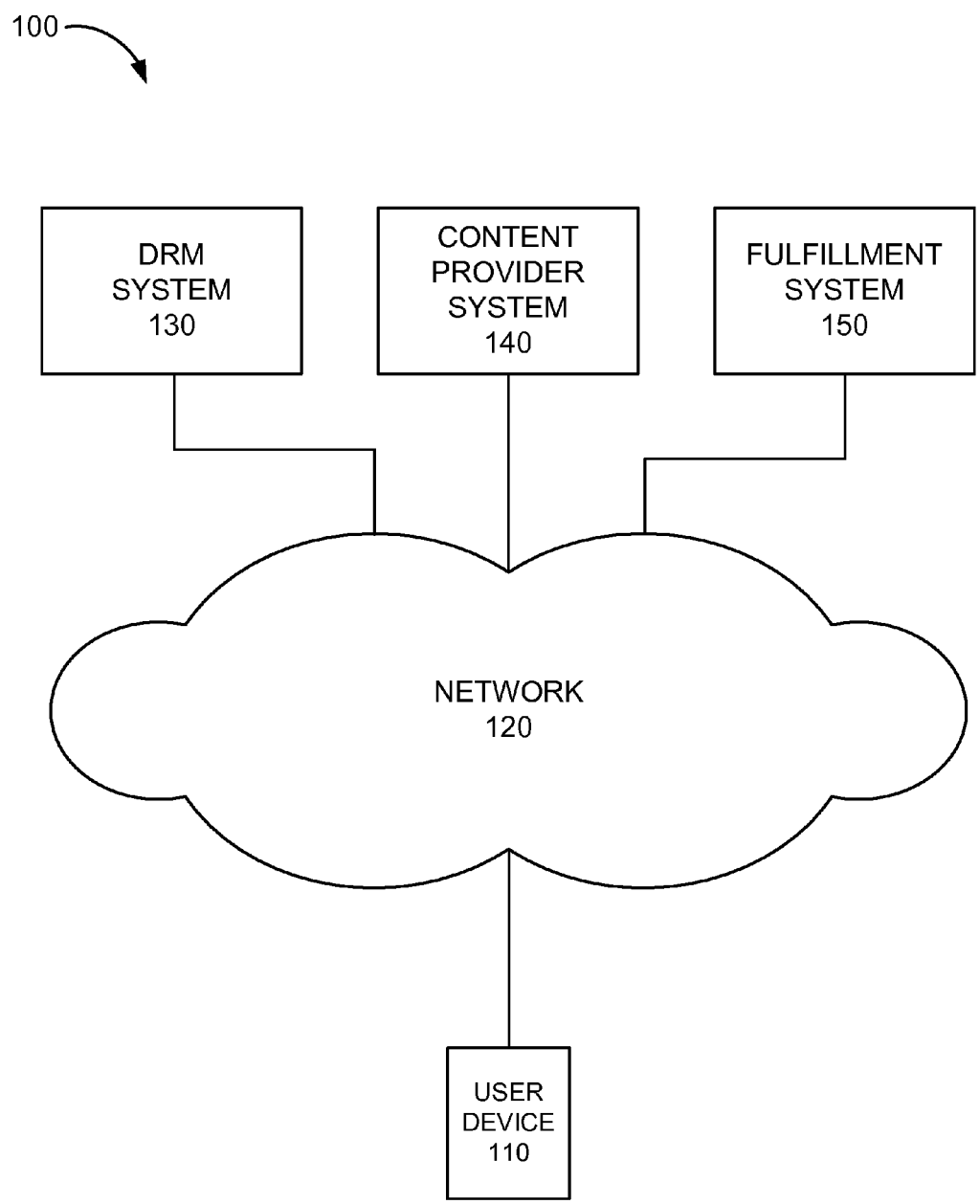
FIG. 1 is a diagram illustrating an environment according to an implementation described herein.

The following detailed description refers to the accompanying drawings. The same reference numbers in different drawings identify the same or similar elements.

Implementations described herein relate to secure distributed information and password management for digital content. "Digital content," as the phrase is used herein, may refer to any digital file, such as an electronic publication (e.g., e-book, magazine article, journal publication, etc.), a video file (e.g., movie, television show, instructional video, etc.), an audio file (e.g., music file, lecture, audiobook, etc.), executable code (e.g., mobile application, game, etc.), and/or any other type of digital file.

A user may obtain access rights to digital content by buying or renting the digital content or by subscribing to the digital content for a particular length of time. A digital rights management (DRM) system may obtain the digital content, may generate a key for the digital content, and may encrypt the digital content using the generated key to generate key encrypted digital content. If the user's rights are set to expire after a particular length of time (e.g, when a rental period ends), the generated key may be assigned an expiration date.

Furthermore, a passcode may be obtained for the digital content. For example, a user may select a passcode or a passcode may be generated for the user. The passcode may be required to access the digital content. The encrypted digital content may be provided to a user device associated with the user along with the obtained passcode.

When the user requests to access the digital content, the user may be prompted to enter the passcode. The user device may request the key from the DRM system using the passcode, may obtain the key from the DRM system if the key has not expired and if the passcode is valid, may use the key to decrypt the digital content in order to enable the user to access the digital content. Moreover, the user may be able to download the content to multiple user devices. As long as the user knows the passcode and the passcode remains valid, the user may access the digital content using multiple user devices.

Furthermore, a first user may transfer access rights for the digital content to a second user. For example, the first user may rent a textbook for a class in an electronic form for the duration of the class. The first user may then decide to drop the class and may want to sell the rented book to a second user for the rest of the semester.

When a first user transfers the access rights for the digital content to a second user, a first passcode, associated with the first user, may be invalidated and a second passcode may be generated for the second user and required for accessing the digital content. The second passcode may be provided to the second user and the second user may then be able to access the digital content using the second passcode, while the first user may lose the ability to access the digital content, since the first passcode may no longer be considered valid by the DRM system.

The DRM system may maintain a list of passcodes in a passcode blockchain. The passcode blockchain may store a sequence of passcodes associated with the particular digital content and may indicate a currently valid passcode. For example, a first passcode may be assigned to a first user and designated as the valid passcode. If the access rights are transferred to a second user, a second passcode may be obtained and added to the blockchain, provided to the second user, and designated as the valid passcode. Thus, the first passcode may no longer be considered valid. If the second user transfers the access rights to a third user, a third passcode may be obtained and added to the blockchain, provided to the third user, and designated as the valid passcode. Thus, the first and second passcodes may no longer be considered valid.

Furthermore, the expiration date associated with the key may continue to be in effect with respect to the second user and/or any subsequent users. Thus, if access rights for a particular digital content are associated with a rental period, or a subscription period, users may continue to transfer the rights to other users during the rental period.

FIG. 1 is a diagram of an exemplary environment 100 in which the systems and/or methods described herein may be implemented. As shown in FIG. 1, environment 100 may include a user device 110, a network 120, a digital rights management (DRM) system 130, a content provider system 140, and a fulfillment system 150.

User device 110 may include any device that includes functionality to communicate with DRM system 130 and that enables a user to access digital content with DRM protection. For example, user device 110 may include a portable communication device (e.g., a mobile phone, a smart phone, a phablet device, a global positioning system (GPS) device, and/or another type of wireless device); a personal computer or workstation; a server device; a laptop, tablet, or another type of portable computer; a media playing device; a portable gaming system; and/or any other type of computer device with communication and content access capabilities. User device 110 may obtain encrypted digital content from DRM system 130. When a user requests to access the encrypted digital content, the user may be required to enter a passcode. User device 110 may then obtain a key from DRM system 130 using the passcode and may use the key to decrypt the digital content to enable the user to access the digital content in an unencrypted form.

Network 120 may enable user device 110 and DRM system 130 to communicate with each other. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

DRM system 130 may include one or more devices, such as computer devices and/or server devices, which manage DRM rights for digital content. For example, DRM system 130 may receive an indication from fulfillment system 150 that a user has acquired access rights to a particular digital content and may obtain the particular digital content from content provider system 140. DRM system 130 may generate a key for the particular digital content and may determine an expiration date for the key. DRM system 130 may further obtain a passcode for the particular digital content and may add the passcode to a passcode blockchain along with an indication that the passcode is valid. DRM system 130 may provide the encrypted content to user device 110. When a user requests to access the particular digital content, user device 110 may request the key from DRM system 130 using the passcode. DRM system 130 may determine whether the passcode is valid and may determine whether the key is still valid based on the expiration date. If the key has not expired and the passcode is valid, DRM system 130 may provide the key to user device 110.

Content provider system 140 may include one or more devices, such as computer devices and/or server devices, which store digital content and provide the digital content to DRM system 130. For example, DRM system 130 may request particular digital content from content provider system 140, in response to receiving an indication from fulfillment system 150 that a user has acquired access rights to the particular digital content, and may receive the particular digital content from content provider system 140.

Fulfillment system 150 may include one or more devices, such as computer devices and/or server devices, configured to process transactions for acquiring rights to digital content. For example, fulfillment system 150 may include a store front for purchasing, renting, and/or subscribing to particular types of digital content, such as e-books, magazines, movies, television shows, music files, and/or other types of digital content. A user may acquire particular access rights to particular digital content by completing a transaction with fulfillment system 150 via user device 110. In response, fulfillment system 150 may send an indication to DRM system 130, informing DRM system 130 that the user has acquired the particular access rights to the particular digital content.

Although FIG. 1 shows exemplary components of environment 100, in other implementations, environment 100 may include fewer components, different components, differently arranged components, or additional components than the ones depicted in FIG. 1. Additionally or alternatively, one or more components of environment 100 may perform functions described as being performed by one or more other components of environment 100.

Figure 2:
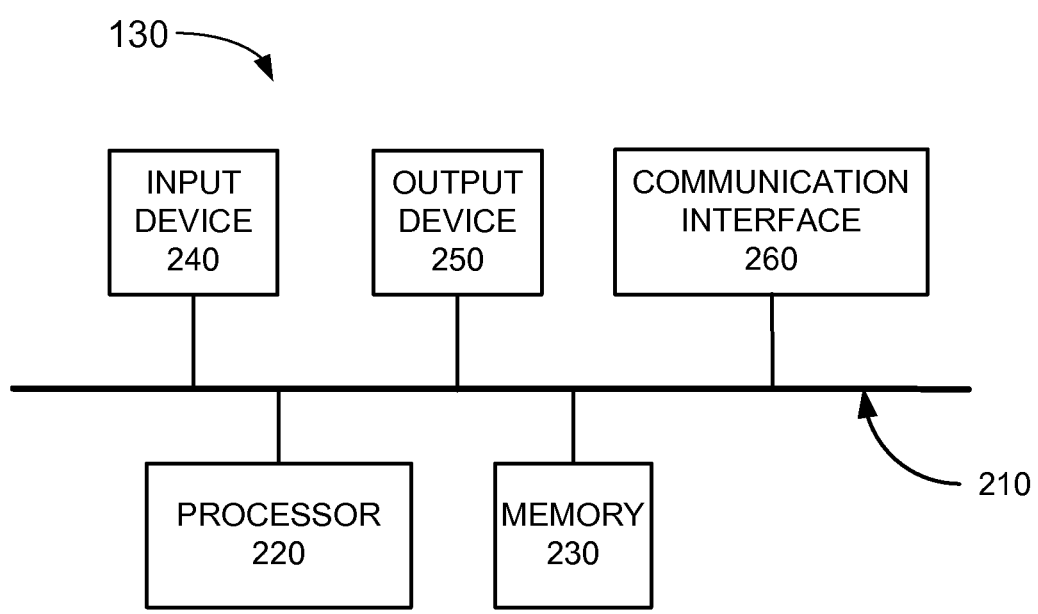
FIG. 2 is a diagram illustrating exemplary components of the digital rights management system of FIG. 1.

FIG. 2 is a diagram illustrating exemplary components of DRM system 130 according to an implementation described herein. As shown in FIG. 2, DRM system 130 may include a bus 210, a processor 220, a memory 230, an input device 240, an output device 250, and a communication interface 260.

Bus 210 may include a path that permits communication among the components of DRM system 130. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into DRM system 130. Input device 240 may include, for example, a keyboard, a mouse, a pen, a microphone, a remote control, an audio capture device, an image and/or video capture device, a touch-screen display, and/or another type of input device. In some embodiments, DRM system 130 may be managed remotely and may not include input device 240. In other words, DRM system 130 may be "headless" and may not include a keyboard, for example.

Output device 250 may output information to an operator of DRM system 130. Output device 250 may include a display, a printer, a speaker, and/or another type of output device. For example, DRM system 130 may include a display, which may include a liquid-crystal display (LCD) for displaying content to the customer. In some embodiments, DRM system 130 may be managed remotely and may not include output device 250. In other words, DRM system 130 may be "headless" and may not include a display, for example.

Communication interface 260 may include a transceiver that enables DRM system 130 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, DRM system 130 may perform certain operations relating to DRM management of digital content. DRM system 130 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of DRM system 130, in other implementations, DRM system 130 may include fewer components, different components, additional components, or differently arranged components than depicted in FIG. 2. Additionally or alternatively, one or more components of DRM system 130 may perform one or more tasks described as being performed by one or more other components of DRM system 130.

Figure 3A:
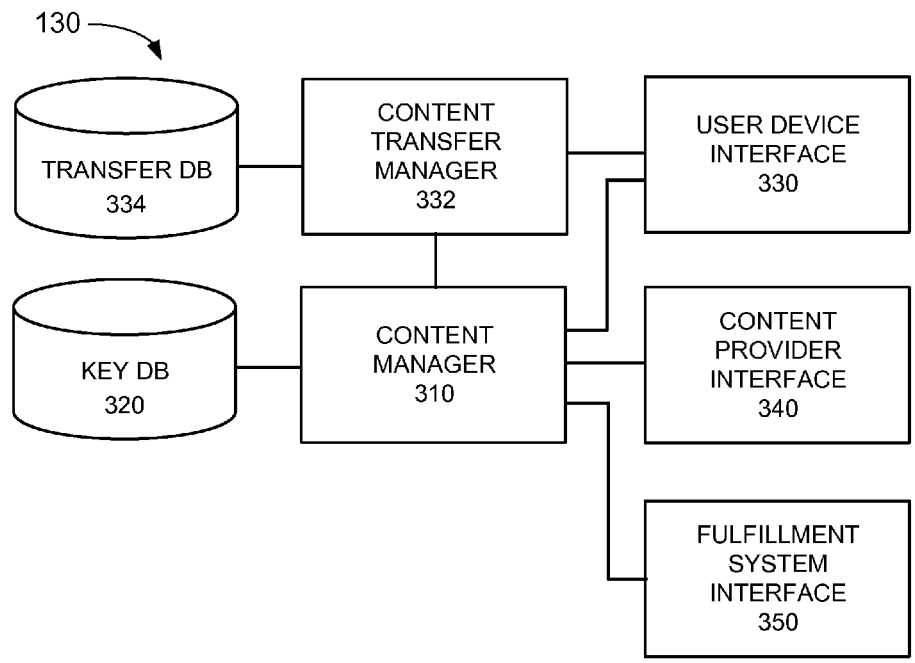
FIG. 3A is a diagram illustrating exemplary functional components of the digital rights management system of FIG. 1.

FIG. 3A is a diagram illustrating exemplary functional components of DRM system 130. The functional components of DRM system 130 may be implemented, for example, via processor 220 executing instructions from memory 230. Additionally or alternatively, some or all of the functional components of DRM system 130 may be hard-wired. As shown in FIG. 3A, DRM system 130 may include a content manager 310, a key database (DB) 320, a user device interface 330, a content transfer manager 332, a transfer DB 334, a content provider interface 340, and a fulfillment system interface 350.

Content manager 310 may manage digital content for which access rights have been acquired by particular users. For example, content manager 310 may manage a key and/or passcodes for particular digital content and may encrypt the particular digital content using the key. Content manager 310 may provide encrypted digital content to user device 110. Content manager 310 may further receive a request, which includes a passcode, for a key associated with the particular digital content and may check whether the passcode and the key are valid. If the passcode is valid and if the key is still valid, content manager 310 may provide the requested key to user device 110. Key DB 320 may store key information relating to particular digital content. Exemplary information that may be stored in key DB 320 is described below with reference to FIG. 3B.

User device interface 330 may enable user device 110 to communicate with other user devices 110 in order to transfer digital content to another user device 110 and/or to receive transferred digital content from another user device 110.

Content transfer manager 332 may manage transfer of particular digital content from a first user to a second user. In some implementations, a first user may request to transfer digital content to a second user and content transfer manager 332 may provide the digital content to the second user. Additionally or alternatively, content transfer manager 332 may maintain a marketplace for transfer of digital content. For example, content transfer manager 332 may provide a message forum, auction web site, and/or another type of store front to enable a user to request particular digital content and/or to enable a user to offer to transfer particular digital content. In some implementations, content transfer manager 332 may be configured to enable users to process transfers of digital contents in connection with a financial transaction, thus enabling users to buy and/or sell access rights to digital content. Content transfer manager 332 may charge a transaction fee for processing a financial transaction. Transfer DB 334 may store information relating to transfers of access rights for digital content, including offers and/or requests for particular digital content.

Content provider interface 340 may communicate with content provider system 140. For example, content provider interface 340 may obtain particular digital content from content provider system 140 in response to determining that a user has acquired access rights to the particular digital content. Fulfillment system interface 350 may communicate with fulfillment system 150. For example, fulfillment system interface 350 may receive an indication from fulfillment system 150 that a user has acquired access rights to particular digital content, in response to a transaction with user device 110.

Although FIG. 3A shows exemplary functional components of DRM system 130, in other implementations, DRM system 130 may include fewer functional components, different functional components, differently arranged functional components, or additional functional components than depicted in FIG. 3A. Additionally or alternatively, one or more functional components of DRM system 130 may perform functions described as being performed by one or more other functional components of DRM system 130.

Figure 3B:
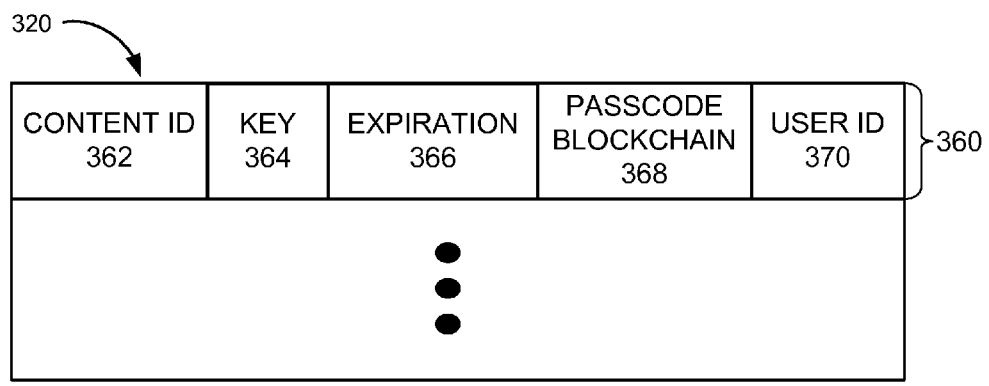
FIG. 3B is a diagram illustrating exemplary components of the key database of FIG. 3A.

FIG. 3B is a diagram of exemplary components of key DB 320. As shown in FIG. 3B, key DB 320 may store one or more content records 360. Each content record 360 may store information relating to DRM associated with a particular digital content. Content record 360 may include a content identifier (ID) field 362, a key field 364, an expiration field 366, a passcode blockchain field 368, and a user ID field 370.

Content ID field 362 may store an identifier that may be used to uniquely identify a particular copy of particular digital content associated with a set of access rights. For example, content ID field 362 may store a name associated with the particular digital content, a digital signature associated with the particular digital content, and/or another type of identifier. Additionally, content ID field 362 may store a transaction identifier associated with a transaction to acquire the set of access rights, such as a purchase or renting of the particular digital content.

Key field 364 may store an encryption key generated for the particular digital content. Key field 364 may also identify a particular encryption algorithm associated with the generated key. Expiration field 366 may store an expiration date associated with the key. The key may remain valid until the expiration date has been reached and may be considered invalid after the expiration date.

Passcode blockchain field 368 may store a passcode blockchain associated with the particular digital content. The passcode blockchain may store a sequence of passcodes associated with the particular digital content and may indicate a currently valid passcode. For example, a first passcode may be assigned to a first user and designated as the valid passcode. If the access rights are transferred to a second user, a second passcode may be obtained and added to the blockchain, provided to the second user, and designated as the valid passcode. Thus, the first passcode may no longer be considered valid. If the second user transfers the access rights to a third user, a third passcode may be obtained and added to the blockchain, provided to the third user, and designated as the valid passcode. Thus, the first and second passcodes may no longer be considered valid.

In some implementations, the passcode may be based on an identifier associated with the user (e.g., name, account number, username, etc.) and/or based on an identifier associated with user device 110 (e.g., IP address, Media Access Control (MAC) address, mobile device identifier, Subscriber Identity Module (SIM) card identifier, etc.) associated with the user. The user may be required to enter the passcode before the key associated with the digital content is requested from DRM system 130.

User ID field 370 may store information identify a current user associated with the particular copy of particular digital content. For example, user ID field 370 may store an identifier associated with the user (e.g., name, account number, username, etc.) and/or an identifier associated with user device 110 (e.g., IP address, Media Access Control (MAC) address, mobile device identifier, Subscriber Identity Module (SIM) card identifier, etc.) associated with the current user. Furthermore, user ID field 370 may store information about the number of user devices 110 to which the user has downloaded the content. The access rights may limit the user to a particular number of user devices 110 to which the digital content may be downloaded.

Although FIG. 3B shows example components of key DB 320, in other implementations, key DB 320 may include fewer components, different components, differently arranged components, or additional components than depicted in FIG. 3B.

Figure 4:
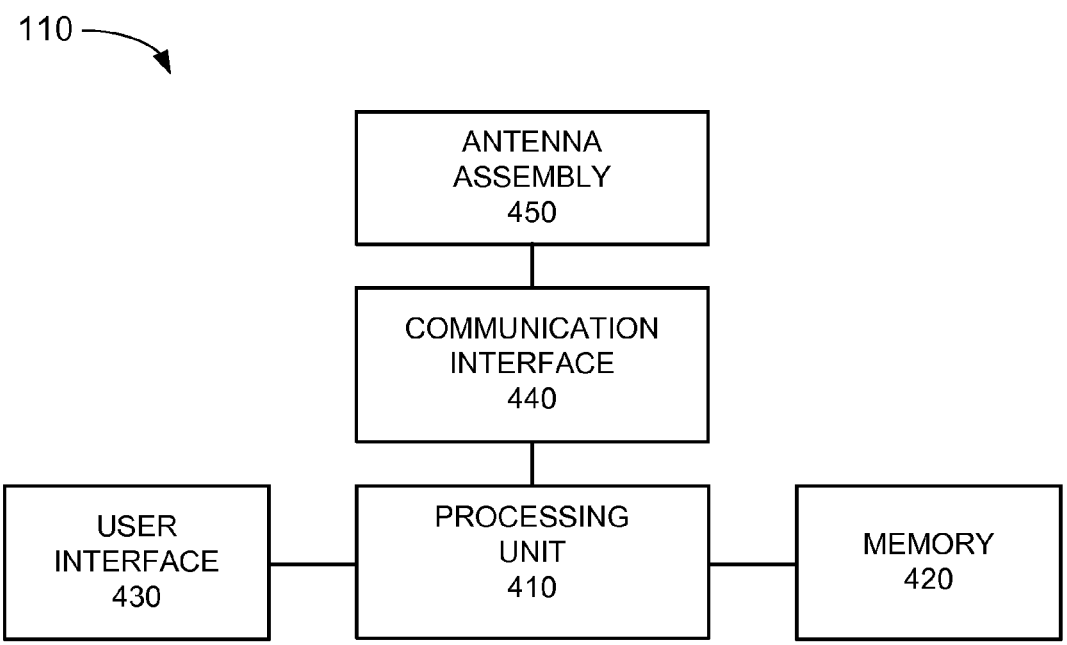
FIG. 4 is a diagram illustrating exemplary components of the user device of FIG. 1.

FIG. 4 is a diagram illustrating example components of a user device 110 according to an implementation described herein. As shown in FIG. 4, user device 110 may include a processing unit 410, a memory 420, a user interface 430, a communication interface 440, and an antenna assembly 450.

Processing unit 410 may include one or more processors, microprocessors, application specific integrated circuits (ASICs), field programmable gate arrays (FPGAs), and/or other processing logic. Processing unit 410 may control operation of user device 110 and its components.

Memory 420 may include a random access memory (RAM) or another type of dynamic storage device, a read only memory (ROM) or another type of static storage device, a removable memory card, and/or another type of memory to store data and instructions that may be used by processing unit 410.

User interface 430 may allow a user to input information to user device 110 and/or to output information from user device 110. Examples of user interface 430 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause user device 110 to vibrate; and/or any other type of input or output device.

Communication interface 440 may include a transceiver that enables user device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 440 may include a transmitter that converts baseband signals to radio frequency (RF) signals and/or a receiver that converts RF signals to baseband signals. Communication interface 440 may be coupled to antenna assembly 450 for transmitting and receiving RF signals.

Communication interface 440 may include a logical component that includes input and/or output ports, input and/or output systems, and/or other input and output components that facilitate the transmission of data to other devices. For example, communication interface 440 may include a network interface card (e.g., Ethernet card) for wired communications and/or a wireless network interface (e.g., a WiFi) card for wireless communications. Communication interface 440 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 450 may include one or more antennas to transmit and/or receive RF signals. Antenna assembly 450 may, for example, receive RF signals from communication interface 440 and transmit the signals and receive RF signals and provide them to communication interface 440.

As described herein, user device 110 may perform certain operations in response to processing unit 410 executing software instructions contained in a computer-readable medium, such as memory 420. A computer-readable medium may be defined as a non-transitory memory device. A non-transitory memory device may include memory space within a single physical memory device or spread across multiple physical memory devices. The software instructions may be read into memory 420 from another computer-readable medium or from another device via communication interface 440. The software instructions contained in memory 420 may cause processing unit 410 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 4 shows example components of user device 110, in other implementations, user device 110 may include fewer components, different components, differently arranged components, or additional components than depicted in FIG. 4. Additionally or alternatively, one or more components of user device 110 may perform the tasks described as being performed by one or more other components of user device 110.

Figure 5:
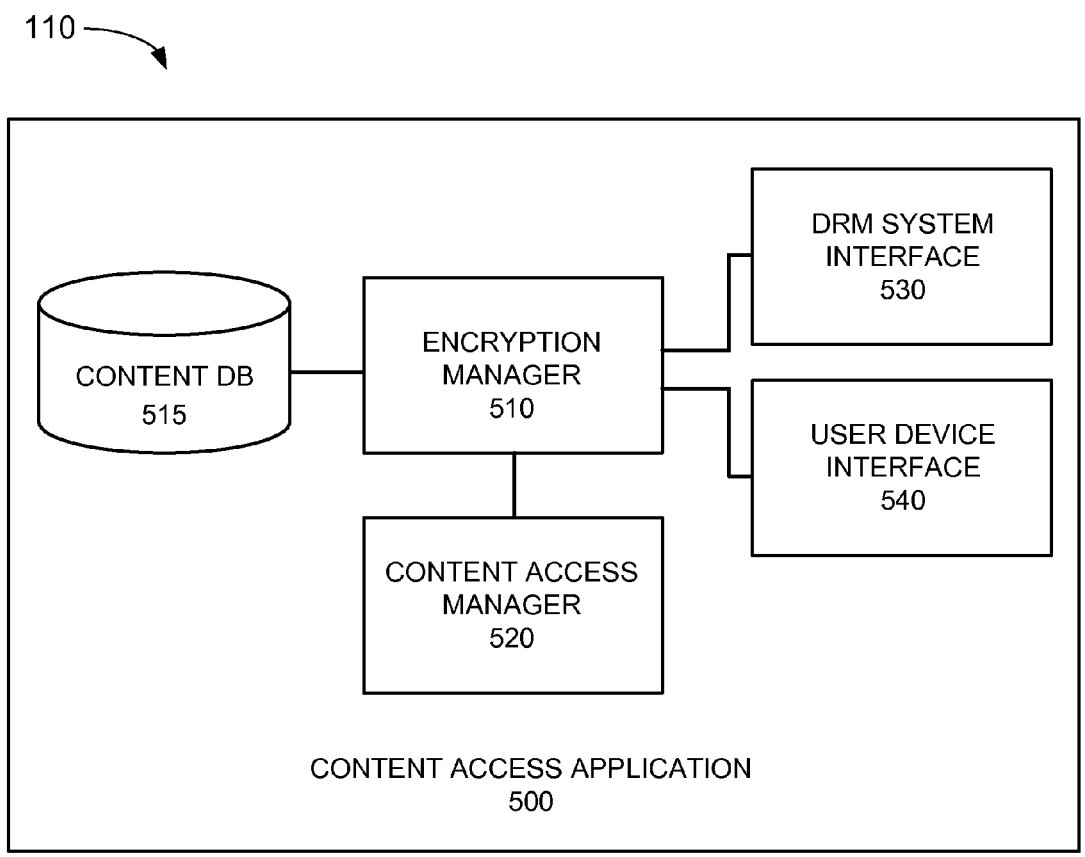
FIG. 5 is a diagram illustrating exemplary functional components of the user device of FIG. 1.

FIG. 5 is a diagram illustrating exemplary functional components of user device 110 according to an implementation described herein. The functional components of user device 110 may be implemented, for example, via processing unit 410 executing instructions from memory 420. Alternatively, some or all of the functional components of user device 110 may be implemented via hard-wired circuitry. As shown in FIG. 5, user device 110 may include a content access application 500. Content access application 500 may enable the user to access particular types of digital content. For example, content access application 500 may include an e-book reader, a media playing application, a mobile application, and/or another type of content access application. Content access application 500 may include an encryption manager 510, a content DB 515, a content access manager 520, a DRM system interface 530, and a user device interface 540.

Encryption manager 510 may decrypt digital content stored in content DB 515 in response to a request to access digital content stored in content DB 515. For example, encryption manager 510 may obtain a passcode from the user to access the digital content or may retrieve a stored passcode from memory. Encryption manager 510 may request the key from DRM system 130 via DRM system interface 530 using the obtained passcode. Encryption manager 510 may receive the key from DRM system 130 and may then decrypt the encrypted digital content using the received key. The decrypted digital content may be provided to content access manager 520 to provide to the user.

Content DB 515 may store digital content associated with content access application 500. The digital content may be stored in an encrypted form. Each particular digital content stored in content DB 515 may be associated with a particular passcode. In some implementations, the particular passcode may be stored in content DB 515 in connection with the particular digital content. In other implementations, the particular passcode may not be stored in content DB 515 and may be provided by the user when requesting to access the digital content.

Content access manager 520 may process requests to access digital content and may provide decrypted content to the user for consumption. For example, if content access application 500 corresponds to an e-reader, content access manager 520 may receive a request to open a particular e-book and may provide a decrypted e-book to user interface 430 for display. As another example, if content access application 500 corresponds to a media player, content access manager 520 may receive a request to play an audio or video file and may begin to output the decrypted audio or video file to user interface 430.

DRM system interface 530 may be configured to communicate with DRM system 130. For example, DRM system interface 530 may obtain encrypted digital content from DRM system 130. Furthermore, when a user requests to access the encrypted digital content from DRM system 130 via content access manager 520, DRM system interface 530 may request a key from DRM system 130 to decrypt the digital content.

User device interface 540 may be configured to communicate with another user device 110. For example, user device interface 540 may establish a connection with the other user device 110 and may transfer the encrypted digital content to the other user device 110. Furthermore, user device interface 540 may be configured to receive encrypted digital content from another user device 110.

Although FIG. 5 shows exemplary functional components of user device 110, in other implementations, user device 110 may include fewer functional components, different functional components, differently arranged functional components, or additional functional components than depicted in FIG. 5. Additionally or alternatively, one or more functional components of user device 110 may perform functions described as being performed by one or more other functional components of user device 110.

Figure 6:
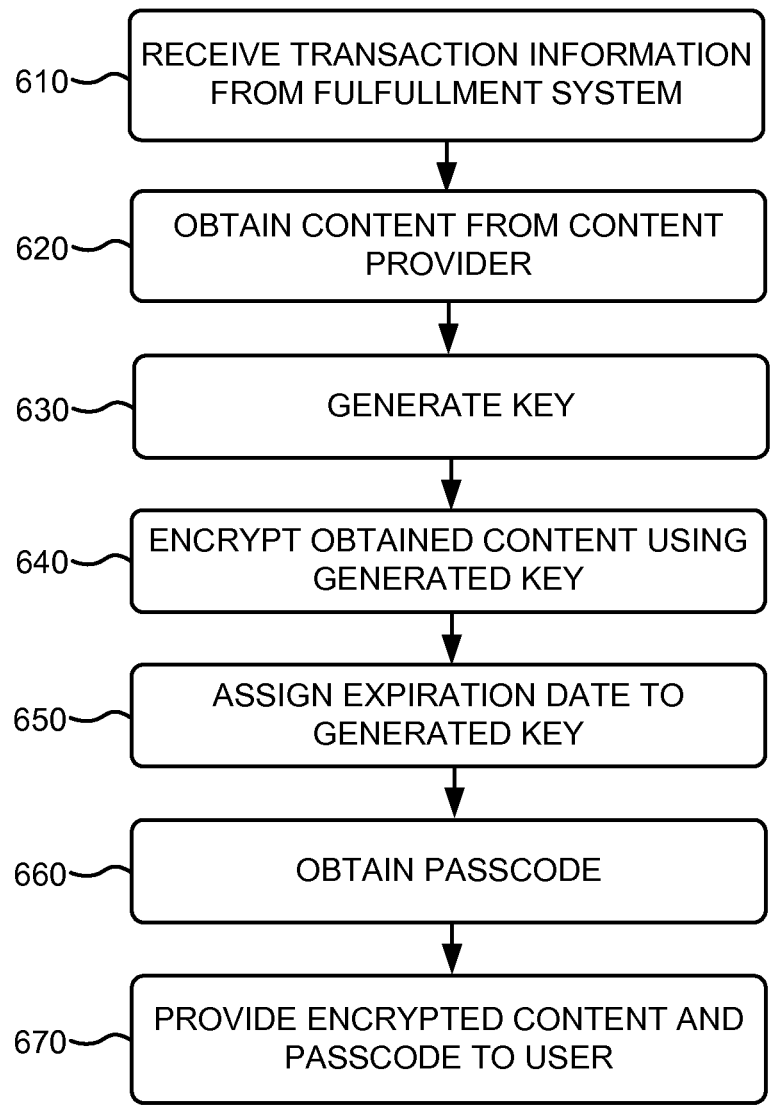
FIG. 6 is a flowchart for providing encrypted content to a user device according to an implementation described herein.

FIG. 6 is a flowchart for providing encrypted content to a user device according to an implementation described herein. In one implementation, the process of FIG. 6 may be performed by DRM system 130. In other implementations, some or all of the process of FIG. 6 may be performed by another device or a group of devices separate from and/or including DRM system 130.

The process of FIG. 6 may include receiving transaction information from a fulfillment system (block 610). For example, DRM system 130 may receive an indication from fulfillment system 150 relating to a transaction from user device 110 to obtain access rights for particular digital content for a user associated with user device 110. The user may have purchased the access rights without a time limitation (e.g., a sale of the digital content) or may have purchased the access rights with a time limitations (e.g., renting the digital content for a particular time period or purchasing a subscription associated with the digital content for a particular time period). Content may be obtained from a provider system (block 620). For example, in response to receiving the indication from fulfillment system 150, DRM system 130 may obtain the digital content from content provider system 140.

A key may be generated (block 630), the obtained content may be encrypted using the generated key (block 640) and an expiration date may be assigned to the generated key (block 650). For example, DRM system 130 may select a particular encryption algorithm and may generate an encryption key based on the selected algorithm. Content manager 310 may use the generated key to encrypt the obtained digital content to generate key encrypted digital content.

A passcode may be obtained (block 660). In some implementations, the passcode may be obtained from content provider system 140 in connection with obtaining the digital content. In other implementations, a passcode may be selected by the user. In yet other implementations, the passcode may be generated by DRM system 130. The passcode may be stored in passcode blockchain field 368 and designated as the valid passcode. The passcode may be required to retrieve a key to decrypt the digital content and thereby obtain access to the digital content (e.g., to open an e-book, play an audio or video file, etc.).

The encrypted content and the passcode may be provided to the user (block 670). For example, DRM system 130 may provide the encrypted digital content, along with the passcode required to request the key to decrypt the digital content, to user device 110. The encrypted digital content may be provided to multiple user devices and the user may use the passcode to obtain the key to access the digital content at any of the user devices.

In some implementations, the access rights may be associated with a subscription. For example, the digital content may correspond to a magazine, recorded lectures, or another type of periodic publication that may be updated at particular intervals. DRM system 130 may be configured to receive periodic updates for particular digital content from content provider 140. DRM system 130 may identify users associated with access rights for the updated content and may send the updated content to user devices 110 associated with the identified user. The updated content may be encrypted with a key associated with each user device 110 and the updated content may be sent in an encrypted form.

Figure 7:
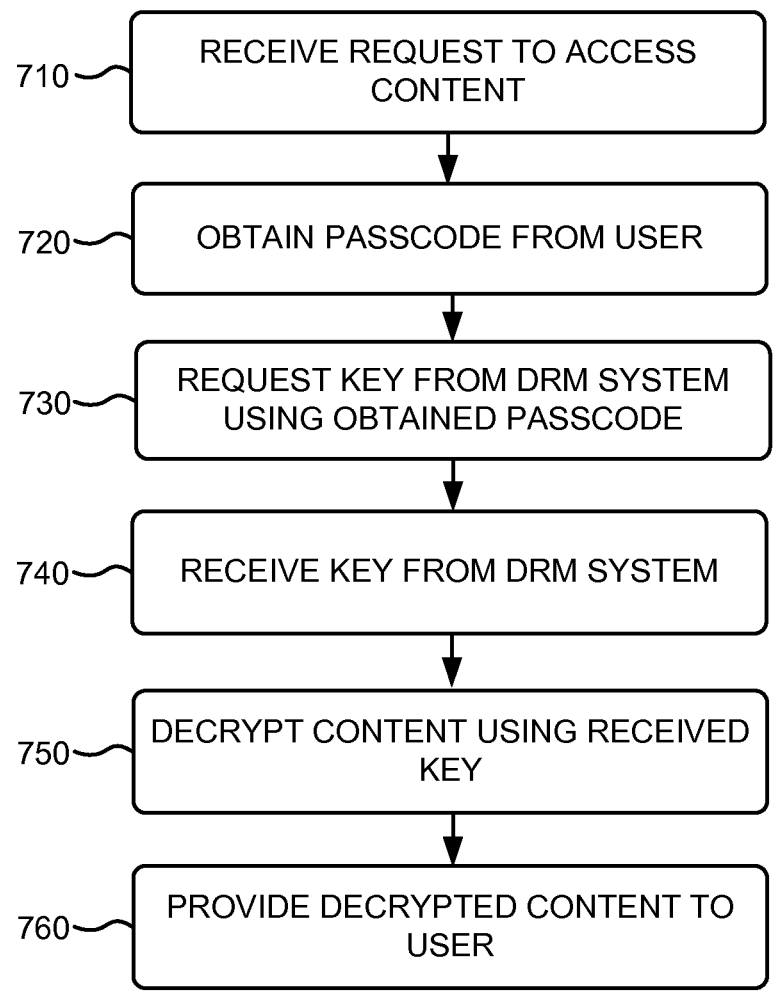
FIG. 7 is a flowchart for accessing protected digital content according to an implementation described herein.

FIG. 7 is a flowchart for accessing protected digital content according to an implementation described herein. In one implementation, the process of FIG. 7 may be performed by user device 110. In other implementations, some or all of the process of FIG. 7 may be performed by another device or a group of devices separate from and/or including user device 110.

The process of FIG. 7 may include receiving a request to access content (block 710). For example, content access manager 520 of content access application 500 may receive a request, via user interface 430, to access digital content stored in content DB 515. For example, the user may request to open an e-book, play an audio or video file, activate an application, etc.

A passcode may be obtained from the user (block 720). In some implementations, content access manager 520 may prompt the user to enter the passcode. In other implementations, content access manager 520 may have previously saved the passcode in memory and the user may not be required to enter the passcode.

A key may be requested from a DRM system using the obtained passcode (block 730), the may be received (block 740), and the content may be decrypted using the received key (block 750). For example, DRM system interface 530 of content access application 500 may request the key from DRM system 130. The request may include the obtained passcode, information identifying the particular digital content to which the user has requested access, information identifying the transaction that granted the user the access rights to the particular digital content, and/or information identifying the user.

Encryption manager 510 of content access application 500 may receive the requested key from DRM system 130 and may use the received key to decrypt the key encrypted content to retrieve an unencrypted form of the digital content. The decrypted content may be provided to the user (block 760). For example, content access manager 520 may provide the unencrypted content to user interface 430 (e.g., display an e-book, play a video, activate an application, etc.).

Figure 8:
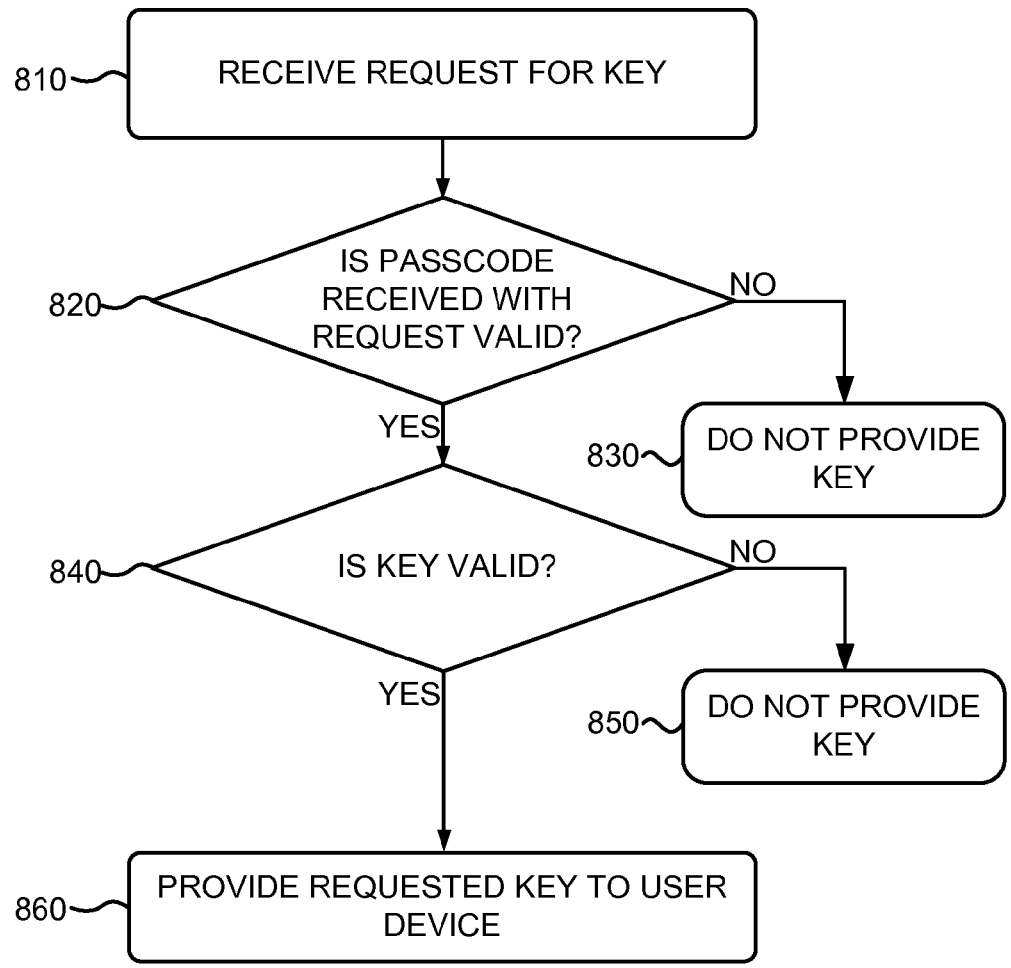
FIG. 8 is a flowchart for processing a request for a key according to an implementation described herein.

FIG. 8 is a flowchart for processing a request for a key according to an implementation described herein. In one implementation, the process of FIG. 8 may be performed by DRM system 130. In other implementations, some or all of the process of FIG. 8 may be performed by another device or a group of devices separate from and/or including DRM system 130.

The process of FIG. 8 may include receiving a request for a key (block 810). For example, user device interface 330 may receive a request for a key along with information identifying particular digital content, information identifying a particular set of access rights associated with the digital content, and a passcode.

A determination may be made as to whether the passcode received with the request is valid (block 820). For example, content manager 310 may identify a content record 360 associated with the received request and may determine whether the passcode is valid by checking passcode blockchain field 368 of the content record 360. If it is determined that the passcode is not valid (block 820—NO), the request for the key may be denied (block 830).

If it is determined that the passcode is valid (block 820—YES), a determination may be made as to whether the key is valid (block 840). For example, content manager 310 may determine whether the key associated with the content record is still valid by checking the expiration field 366 of the identified content record 360. If the key has expired (block 840—NO), DRM system 130 may deny the request and may inform user device 110 that the key has expired (block 850). If the key is still valid (block 840—YES), the requested key may be provided to the user device (block 860). For example, user device interface 330 may send the requested key to user device 110.

Figure 9:
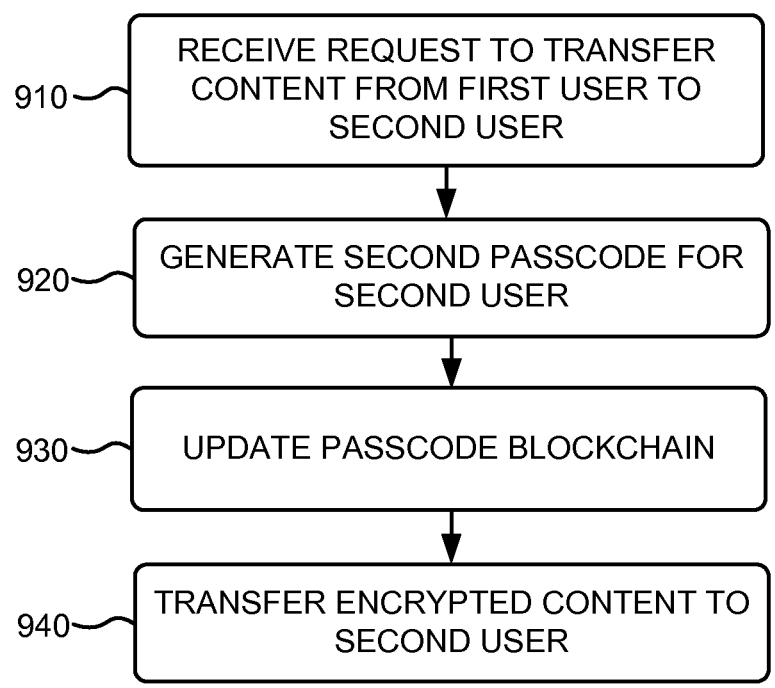
FIG. 9 is a flowchart for transferring digital content from a first user to a second user according to an implementation described herein.

FIG. 9 is a flowchart for a first process of transferring digital content from a first user to a second user according to an implementation described herein. In one implementation, the process of FIG. 8 may be performed by DRM system 130. In other implementations, some or all of the process of FIG. 8 may be performed by another device or a group of devices separate from and/or including DRM system 130.

The process of FIG. 8 may include receiving a request to transfer content from a first user to a second user (block 910). For example, content access application 500 may send a request, on behalf of a first user, to DRM system 130 to transfer a particular digital content to a second user.

A second passcode may be generated for the second user (block 920) and a passcode blockchain may be updated with the second passcode (block 930). In some implementations, the second passcode may be obtained from content provider system 140 in connection with obtaining the digital content. In other implementations, the second passcode may be selected by the second user. In yet other implementations, the second passcode may be generated by DRM system 130. The second passcode may be stored in passcode blockchain field 368 and designated as the valid passcode.

The encrypted content may be transferred to the second user (block 940). For example, DRM system 130 may provide the encrypted digital content, along with the second passcode required to access the digital content, to user device 110 associated with the second user. In some implementations, the transfer of the encrypted digital content may be made directly from the first user device 110 to the second user device 110 using a wired connection (e.g., Universal Serial Bus (USB) cable) or a wireless connection (e.g., Bluetooth connection, NFC connection, etc.). In other implementations, the transfer may be made over a network (e.g., network 120).

In some implementations, the first user device 110 may request information identifying the second user from DRM system 130. Content transfer manager 332 may access transfer DB 334 to identify a second user that has expressed interest in the digital content that the first user is trying to transfer and may provide information identifying the second user to user device 110 associated with the first user.

Figure 10A:
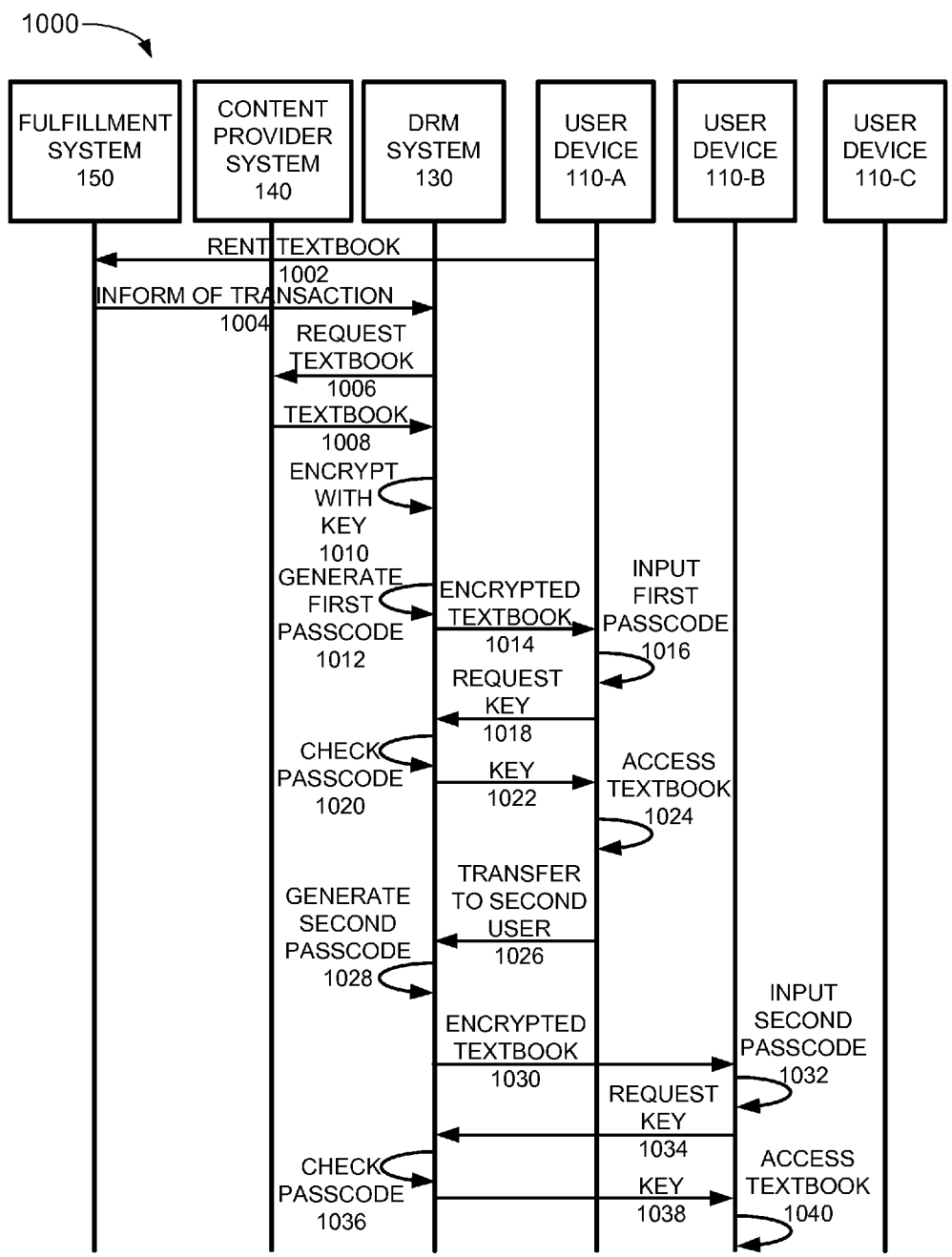
FIGS. 10A-10B are diagrams of an exemplary digital content transfer scenario according to an implementation described herein.
Figure 10B:
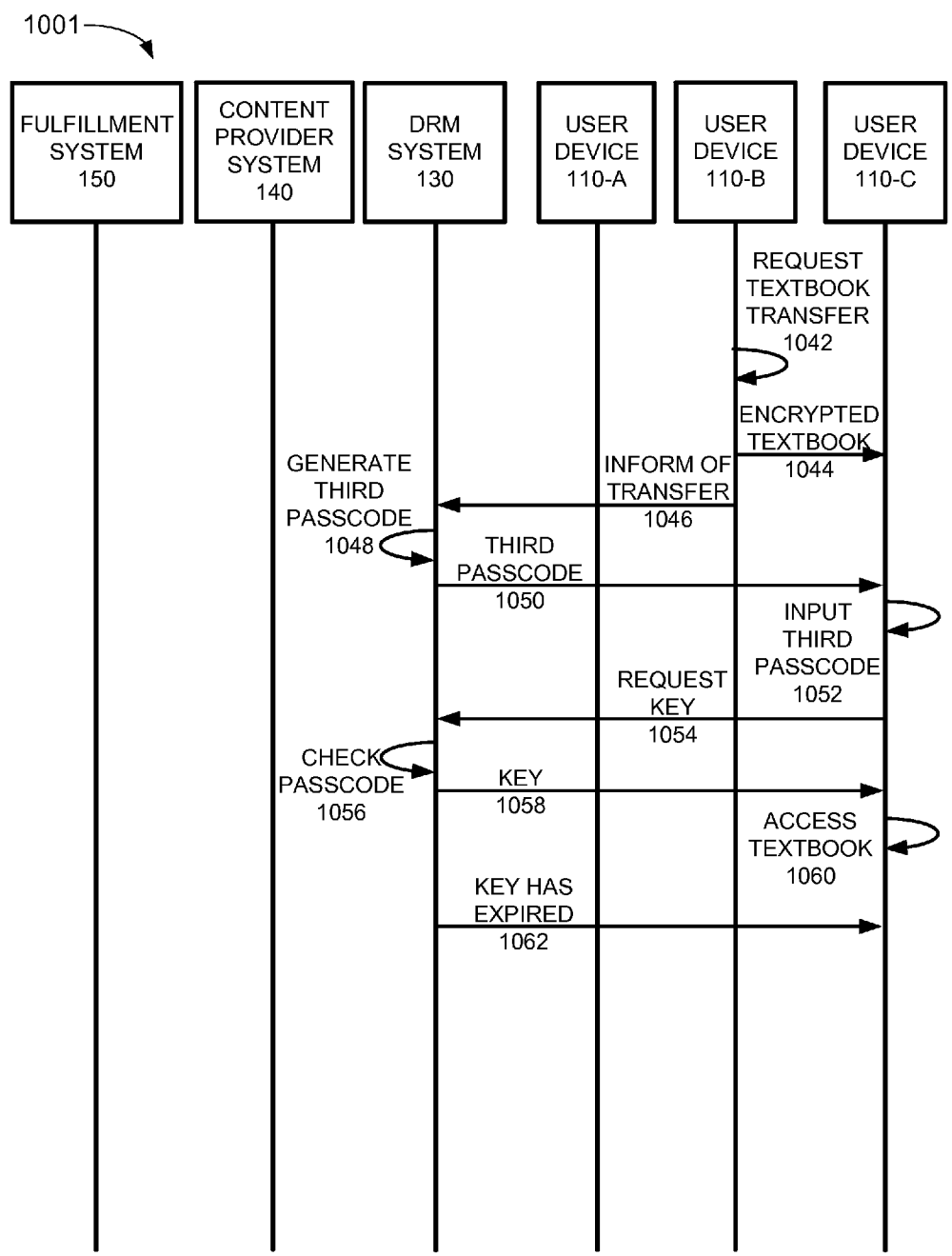

FIGS. 10A and 10B are diagrams of an exemplary digital content transfer scenarios 1000 to 1001 according to an implementation described herein. As shown in FIG. 10A, scenario 1000 may begin with user device 110-A renting a textbook from a store front hosted by fulfillment system 150 (signal 1002). In response, fulfillment system 150 may inform DRM system 130 of the transaction (signal 1004) and DRM system 150 may request and receive the rented textbook from content provider system 140 (signals 1006 and 1008).

DRM system 130 may generate a key, set an expiration date for the key based on the rental period set by fulfillment system 150 (e.g., one semester), and may encrypt the textbook with the generated key (signal 1010). DRM system 130 may then generate a first passcode and add the first passcode to the passcode blockchain (signal 1012). DRM system 130 may proceed to provide the encrypted textbook, along with the generated first passcode, to user device 110-A (signal 1014).

The first user, associated with user device 110-A, may now access the textbook by inputting the first passcode (signal 1016). Alternatively, the first passcode may be saved in memory and obtained automatically when the user activates a reader application to open the textbook. In response to a request to access the textbook, user device 110-A may use the inputted first passcode to request the key to decrypt the textbook (signal 1018). DRM system 130 may check whether the first passcode is valid and may check whether the key is still valid (signal 1020). DRM system 130 may determine that the first passcode is valid and may provide the key to user device 110-A (signal 1022). User device 110-A may use the key to decrypt the textbook and may enable the first user to access the textbook (signal 1024).

At a later time, the first user may decide to drop the class for which the first user has rented the textbook and may decide to transfer the textbook to a second user. For example, the first user may browse a marketplace web page hosted by DRM 130, which may include a list of users looking to acquire access rights to the textbook. The first user may elect to transfer the access rights to a second user, associated with user device 110-B (signal 1026). In response, DRM system 130 may generate a second passcode and may update the passcode blockchain to indicate that the second passcode is now valid and that the first passcode is no longer valid (signal 1028). DRM system 130 may provide the textbook in an encrypted form to user device 110-B, along with the generated second passcode (signal 1030).

The second user, associated with user device 110-B, may now access the textbook by inputting the second passcode (signal 1032). Alternatively, the second passcode may be saved in memory and obtained automatically when the user activates a reader application to open the textbook. In response to a request to access the textbook, user device 110-B may use the inputted second passcode to request the key to decrypt the textbook (signal 1034). DRM system 130 may check whether the second passcode is valid and may check whether the key is still valid (signal 1036). DRM system 130 may determine that the second passcode is valid and may provide the key to user device 110-B (signal 1038). User device 110-B may use the key to decrypt the textbook and may enable the second user to access the textbook (signal 1040).

Continuing with scenario 1001 in FIG. 10B, the second user may finish using the textbook and may decide to transfer the access rights to a third user, associated with user device 110-C (signal 1042). The second user may transfer the encrypted textbook directly from user device 110-B to user device 110-C using an NFC connection, or another wireless or wired connection (signal 1044). Furthermore, content access application 500 may send a message to DRM system 130, informing DRM system 130 that the access rights have been transferred to the third user (signal 1046).

In response, DRM system 130 may generate a third passcode and may update the passcode blockchain field 368 to indicate that the third passcode is now valid and that the first passcode and the second passcode are no longer valid (signal 1048). DRM system 130 may provide the textbook in an encrypted form to user device 110-C, along with the generated third passcode (signal 1050).

The third user, associated with user device 110-C, may now access the textbook by inputting the third passcode (signal 1052). Alternatively, the third passcode may be saved in memory and obtained automatically when the user activates a reader application to open the textbook. In response to a request to access the textbook, user device 110-C may use the inputted third passcode to request the key to decrypt the textbook (signal 1054). DRM system 130 may check whether the third passcode is valid and may check whether the key is still valid (signal 1056). DRM system 130 may determine that the third passcode is valid and may provide the key to user device 110-C (signal 1058). User device 110-C may use the key to decrypt the textbook and may enable the third user to access the textbook (signal 1060). At some later time, at the end of the semester, the rental period may end and the key may expire. DRM system 130 may identify user device 110-C as being associated with access rights to the textbook and may inform the third user that the key has expired (signal 1062).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6-9, and a series of signals have been described with respect to FIGS. 10A-10B, the order of the blocks and signals may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
  receiving, by the computer device, an indication that a first user has acquired rights to access a digital content;
  generating, by the computer device, a key for the digital content;

encrypting, by the computer device, the digital content using the generated key to generate encrypted digital content;

obtaining, by the computer device, a first passcode, wherein the first passcode is required to obtain the key;

providing, by the computer device, the first passcode and the encrypted digital content to a user device associated with the first user;

receiving, by the computer device, a request from the first user to transfer the digital content to a second user;

obtaining, by the computer device, a second passcode;

updating, by the computer device, a passcode blockchain to indicate that the second passcode is valid and that the first passcode is no longer valid; and providing, by the computer device, the second passcode and the encrypted digital content to a user device associated with the second user.

2. The method of claim 1, wherein the key is configured to expire after a particular expiration date.

3. The method of claim 2, further comprising:
receiving, from the user device associated with the first user, a request for the key, wherein the request includes the first passcode;
determining that the first passcode is valid;
determining that the key has not expired; and
providing the key to the user device, in response to determining that the first passcode is valid and that the key has not expired.

4. The method of claim 2, wherein the expiration date is based on at least one of a rental period or a subscription period associated with the digital content.

5. The method of claim 1, further comprising:
receiving the indication that the first user has acquired the rights to access the digital content from a fulfillment system configured to process transactions for buying or renting the digital content; and
obtaining the digital content from a content provider system, in response to receiving the indication.

6. The method of claim 5, further comprising:
receiving an updated digital content from the content provider system;
encrypting the updated digital content using the generated key to generate encrypted updated digital content; and
providing the encrypted updated digital content to the user device associated with the first user.

7. The method of claim 1, further comprising:
receiving a message from the second user indicating that the second user is interested in obtaining the rights to the digital content;
receiving a request from the first user to transfer the digital content; and
identifying the second user based on the received message.

8. A computer device comprising:
a memory to instructions; and
a processor configured to execute the instructions to:
receive an indication that a first user has acquired rights to access a digital content;
generate a key for the digital content;
encrypt the digital content using the generated key to generate encrypted digital content;
obtain a first passcode, wherein the first passcode is required to obtain the key;
provide the first passcode and the encrypted digital content to a user device associated with the first user;
receive a request from the first user to transfer the digital content to a second user;
obtain a second passcode;
update a passcode blockchain to indicate that the second passcode is valid and that the first passcode is no longer valid; and
provide the second passcode and the encrypted digital content to a user device associated with the second user.

9. The computer device of claim 8, wherein the key is configured to expire after a particular expiration date.

10. The computer device of claim 9, wherein the processor is further configured to:
receive, from the user device associated with the first user, a request for the key, wherein the request includes the first passcode;
determine that the first passcode is valid;
determine that the key has not expired; and
provide the key to the user device associated with the first user, in response to determining that the first passcode is valid and that the key has not expired.

11. The computer device of claim 9, wherein the expiration date is based on at least one of a rental period or a subscription period associated with the digital content.

12. The computer device of claim 8, wherein the processor is further configured to:
receive the indication that the first user has acquired the rights to access the digital content from a fulfillment system configured to process transactions for buying or renting the digital content; and
obtain the digital content from a content provider system, in response to receiving the indication.

13. The computer device of claim 12, wherein the processor is further configured to:
receive an updated digital content from the content provider system;
encrypt the updated digital content using the generated key to generate encrypted updated digital content; and
provide the encrypted updated digital content to the user device associated with the first user.

14. The computer device of claim 8, wherein the processor is further configured to:
receive a message from the second user indicating that the second user is interested in obtaining the rights to the digital content;
receive a request from the first user to transfer the digital content; and
identify the second user based on the received message.

15. A non-transitory computer-readable memory device storing instructions executable by a processor, the non-transitory computer-readable memory device comprising:
one or more instructions to receive an indication that a first user has acquired rights to access a digital content;
one or more instructions to generate a key for the digital content;
one or more instructions to encrypt the digital content using the generated key to generate encrypted digital content;
one or more instructions to obtain a first passcode, wherein the first passcode is required to obtain the key;
one or more instructions to provide the first passcode and the encrypted digital content to a user device associated with the first user;
one or more instructions to receive a request from the first user to transfer the digital content to a second user;
one or more instructions to obtain a second passcode;
one or more instructions to update a passcode blockchain to indicate that the second passcode is valid and that the first passcode is no longer valid; and one or more instructions to provide the second passcode and the encrypted digital content to a user device associated with the second user.

16. The non-transitory computer-readable memory device of claim 15, wherein the key is configured to expire after a particular expiration date.

17. The non-transitory computer-readable memory device of claim 15, further comprising:
one or more instructions to receive, from the user device associated with the first user, a request for the key, wherein the request includes the first passcode;
one or more instructions to determine that the first passcode is valid;
one or more instructions to determine that the key has not expired; and
one or more instructions to provide the key to the user device associated with the first user, in response to determining that the first passcode is valid and that the key has not expired.

18. The non-transitory computer-readable memory device of claim 15, further comprising:
one or more instructions to receive the indication that the first user has acquired the rights to access the digital content from a fulfillment system configured to process transactions for buying or renting the digital content; and
one or more instructions to obtain the digital content from a content provider system, in response to receiving the indication.

19. The non-transitory computer-readable memory device of claim 18, further comprising:
one or more instructions to receive an updated digital content from the content provider system;
one or more instructions to encrypt the updated digital content using the generated key to generate encrypted updated digital content; and
one or more instructions to provide the encrypted updated digital content to the user device associated with the first user.

20. The non-transitory computer-readable memory device of claim 15, further comprising:
one or more instructions to receive a message from the second user indicating that the second user is interested in obtaining the rights to the digital content;
one or more instructions to receive a request from the first user to transfer the digital content; and
one or more instructions to identify the second user based on the received message.

* * * * *